United States Patent
Soch

(10) Patent No.: US 7,161,333 B2
(45) Date of Patent: Jan. 9, 2007

(54) SYSTEM AND METHOD FOR DETERMINING LOAD CURRENT IN SWITCHING REGULATORS OPERABLE IN PULSE SKIPPING MODE

(75) Inventor: Kevin Soch, Nevada City, CA (US)

(73) Assignee: Linear Technology Corporation, Milpitas, CA (US)

( * ) Notice: Subject to any disclaimer, the term of this patent is extended or adjusted under 35 U.S.C. 154(b) by 162 days.

(21) Appl. No.: 11/006,746

(22) Filed: Dec. 8, 2004

(65) Prior Publication Data

US 2006/0119338 A1 Jun. 8, 2006

(51) Int. Cl.
*G05F 3/16* (2006.01)
*G05F 1/40* (2006.01)

(52) U.S. Cl. ............... 323/224; 323/284; 323/285; 323/286; 323/222

(58) Field of Classification Search ........... 323/224, 323/284, 285, 286, 222
See application file for complete search history.

(56) References Cited

U.S. PATENT DOCUMENTS

| 4,694,239 | A | * | 9/1987 | Marchio' et al. | 323/285 |
| 5,552,694 | A | * | 9/1996 | Appeltans | 323/222 |
| 6,366,070 | B1 | * | 4/2002 | Cooke et al. | 323/284 |
| 6,396,252 | B1 | * | 5/2002 | Culpepper et al. | 323/285 |

* cited by examiner

*Primary Examiner*—Shawn Riley
(74) *Attorney, Agent, or Firm*—McDermott Will & Emery LLP

(57) ABSTRACT

Novel circuitry and methodology for determining a load current in a switching regulator circuit operable in a pulse skipping mode of operation and having main and synchronous switches. The load current is determined based on a ratio of time when the synchronous switch is on in the pulse skipping mode to an average period of a switching cycle in the pulse skipping mode. The load current may be measured by a circuit that determines an average value of a switch control signal for controlling the synchronous switch. The load current determining circuit may comprise a low-pass filter for filtering the switch control signal proportional to an input voltage supplied to the switching regulator circuit.

18 Claims, 3 Drawing Sheets

SYSTEM AND METHOD FOR DETERMINING LOAD CURRENT IN SWITCHING REGULATORS OPERABLE IN PULSE SKIPPING MODE

FIELD OF THE INVENTION

This disclosure relates to power supply systems, and more particularly, to circuitry and methodology for determining a load current in pulse skipping switching regulators.

BACKGROUND ART

Measuring the load current supplied by a step down or step up switching regulator is a difficult problem. It can be accomplished by placing a resistor in series with the load, and measuring the voltage across this resistor. This approach has a significant disadvantage because it reduces the efficiency of the regulator, and requires an additional pin on the device if the resistor is external.

Another approach is to determine the load current by following the feedback voltage in the control loop. This approach is completely independent of external components and voltage levels, but typically it results in a low gain signal on the order of 1 mV/mA of the load current.

Hence, there is a need for circuitry and methodology substantially independent of external components that would provide an adequate gain to reliably discern between small changes in load current.

SUMMARY OF THE DISCLOSURE

The present disclosure offers novel circuitry and methodology for determining a load current in a switching regulator circuit operable in a pulse skipping mode of operation and having a first switch and a second switch. The load current is determined based on a ratio of time when the second switch is on in the pulse skipping mode to an average period of a switching cycle in the pulse skipping mode.

The first switch may be turned on when the second switch is turned off, if the load current exceeds a predetermined value, whereas the first switch may be prevented from turning on when the second switch is turned off, if the load current does not exceed the predetermined value. For example, the first switch may be a main switch of the switching regulator, and the second switch may be a synchronous switch of the switching regulator.

In accordance with one aspect of the disclosure, the load current may be measured by a circuit that determines an average value of a switch control signal for controlling the synchronous switch. For example, the load current determining circuit may comprise a low-pass filter for filtering the switch control signal.

In accordance with another aspect of the disclosure, the switch control signal may be proportional to an input voltage supplied to the switching regulator circuit.

In accordance with an embodiment of the invention, the load current may be determined in a step-down switching regulator, where the first switch comprises a P-type field-effect transistor and the second switch comprises an N-type field-effect transistor.

In accordance with another embodiment of the invention, the load current may be determined in a step-up switching regulator, where the first switch comprises an N-type field-effect transistor and the second switch comprises a P-type field-effect transistor.

In accordance with a method of the present disclosure, a duty cycle of the second switch is measured in a pulse skipping mode, and the load current is determined therefrom.

In particular, for a step-down switching regulator, a duty cycle of the N-type field effect element may be measured to determine the load current, and for a step-up switching regulator, the load current may be determined based on a duty cycle of the P-type field-effect element.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with examples of determining a load current in specific switching regulator arrangements. It will become apparent, however, that the concepts described herein are applicable to any switching regulator operable in a pulse skipping mode.

Figure 1:
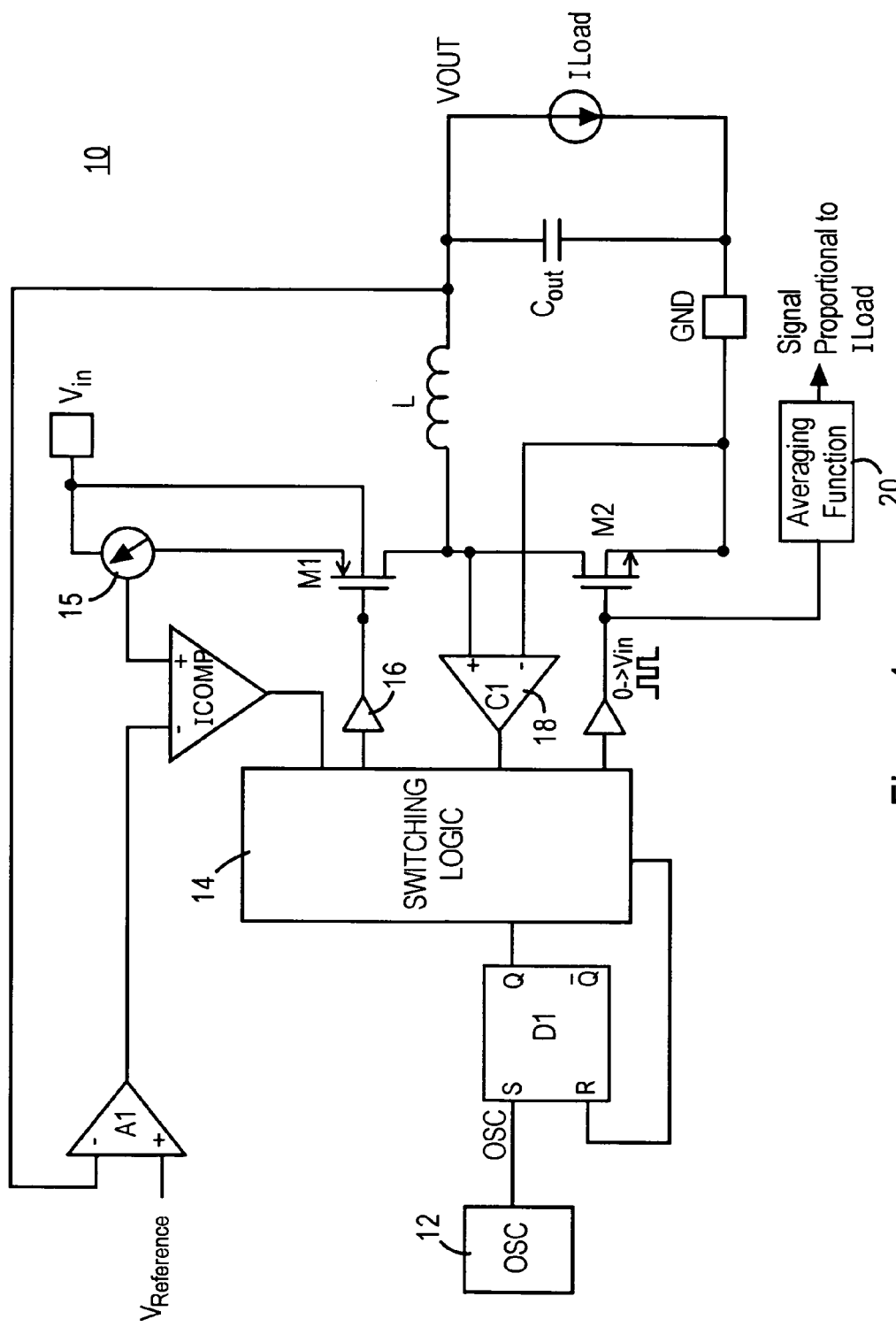
FIG. 1 is a diagram showing a synchronous step-down switching regulator in accordance with a present disclosure.

FIG. 1 shows a simplified block diagram of a synchronous step-down switching regulator 10 generating a regulated output voltage Vout less than an input supply voltage Vin. The switching regulator 10 includes a main switch M1 and a synchronous switch M2. For example, the main switch M1 may be a P-type MOSFET, whereas the synchronous switch M2 may be an N-type MOSFET. Also, the switching regulator 10 comprises an inductor L connected between electrodes of the switches M1 and M2 and the output terminal Vout, and an output capacitor Cout connected between the output terminal Vout and a ground terminal.

The switches M1 and M2 are switched by a switching arrangement including a pulse oscillator 12 that generates pulses to set a latch D1 having set (S) and reset (R) inputs and output Q. One input of a switching logic 14 is coupled to the output Q, and another input is controlled by the output of a current comparator ICOMP, which has one input coupled to a current-to-voltage converter 15 and another input connected to the output of an error amplifier A1 provided for comparing the output voltage Vout with a reference voltage. Vreference. The third input of the switching logic 14 is controlled by a reverse current comparator C1. Buffers 16 and 18 are provided at the outputs of the switching logic 14 for driving gates of the switches M1 and M2, respectively.

In a typical switching cycle, the main switch M1 is closed when the oscillator 12 sets the latch D1. The current in the inductor L flows from Vin to Vout until it reaches a level set by the feedback loop through the error amplifier A1. This is accomplished by the current comparator ICOMP that compares the instantaneous inductor current with a level set by the output of the error amplifier A1. When the load current ILoad increases, the comparator reference level increases causing an increase in the peak inductor current. When the peak is reached, the main switch M1 is opened, the synchronous switch M2 is closed, and the latch D1 is reset by the switching logic 14. The current in the inductor then begins to decrease until the oscillator 12 again sets the latch D1 and the cycle is repeated.

As the load current ILoad decreases, the switching regulator 10 transfers to a discontinuous mode. In particular, at a lower level of the load current ILoad, the inductor current is at a level low enough to reach zero before the next oscillator pulse arrives when the synchronous switch M2 is closed. The current in the inductor will begin to reverse—flowing from the output through the switch M2 to ground. This reversal is sensed by the reverse current comparator C1 which signals the switching logic 14 to open the switch M2.

At even lower load currents, the reference level set by the error amplifier A1 at the input of the current comparator ICOMP reaches a minimum level. At this point, as soon as the main switch M1 is closed, the current exceeds the allowed level, controlling the current comparator ICOMP to signal the switching logic 14 to open the main switch M1. Delays in the circuitry cause a gap in time between the moment when the current comparator ICOMP trips and moment when the main switch is opened. This minimum time period, during which the main switch is closed, will be referred to as $t_{min}$. During this $t_{min}$ period and the subsequent decay in the inductor current, more charge than required is provided to the output capacitor Cout, causing a momentary increase ΔVout in the output voltage. Circuitry in the switching logic 14 then prevents the oscillator 12 from turning on the switches M1 and M2 until the fault is cleared. In the interim, pulses from the oscillator 12 are skipped. This state is referred to as a pulse skipping mode.

In summary, as the load current ILoad decreases, a step-down regulator 10 transitions from a continuous mode to a discontinuous mode, and then to a pulse skipping mode. Pulse skipping occurs when the current sense input to the current comparator ICOMP decreases to a minimum clamped level. Further charge dumped onto the output capacitor Cout causes the error voltage set by the error amplifier A1 at the input of the current comparator ICOMP to fall below the clamped voltage level. When this happens, the current comparator ICOMP does not reset, and switching cycles are skipped until the output voltage Vout droops enough to bring the error voltage at the output of the error amplifier A1 back above the clamped level.

Figure 2:
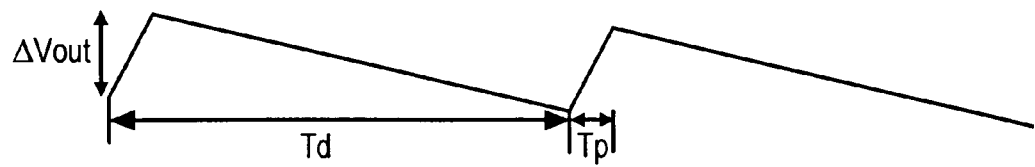
FIG. 2 is a diagram illustrating the output voltage ripple during a pulse skipping cycle.

FIG. 2 depicts the output voltage Vout ripple during a pulse skipping cycle. During a switching cycle, the output is bumped up an amount ΔVout. This voltage then decays at a linear rate dependent on the load current ILoad and a value of the capacitor Cout until another switching cycle occurs. A time interval Tp represents the time, during which the main and synchronous switches M1 and M2 are closed. A time interval Td represents the average pulse skipping period.

Figure 3:
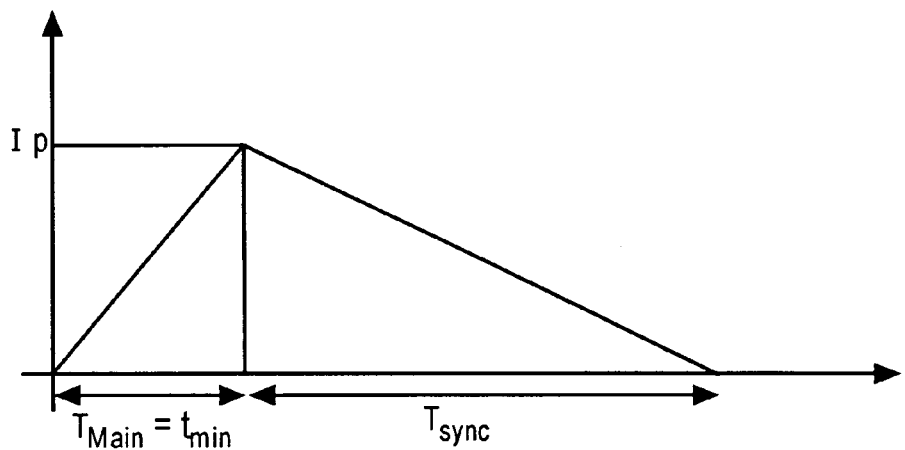
FIG. 3 is a diagram illustrating the inductor current when the main and synchronous switches are closed in a pulse skipping mode.

FIG. 3 is an expanded depiction of the inductor current Ip during the time interval Tp when the main and synchronous switches are closed. In a pulse skipping mode, the main switch M1 is on for a time $T_{Main}=t_{min}$, and the synchronous switch M2 is on for a period of time $T_{sync}$.

When the regulator 10 is in a pulse skipping mode, the load current ILoad can be inferred by calculating the ratio of $T_{sync}$ to Td, which is the $T_{sync}$ duty cycle, i.e. the duty cycle of the synchronous switch M2 in a pulse skipping mode. Specifically:

$$\frac{T_{sync}}{Td} = \frac{2*L*ILoad}{t_{min}*Vin},$$

or explicitly in terms of ILoad:

$$ILoad = \frac{T_{sync}*t_{min}*Vin}{2*Td*L},$$

where L is the inductance of the inductor L.

The quantity ILoad can be calculated by determining the average value of the signal driving the switch M2 in the closed state. Furthermore, the dependence of the load current value ILoad on the value of the input voltage Vin can be removed if the signal controlling the switch M2 is made proportional to the input voltage Vin.

Figure 4:
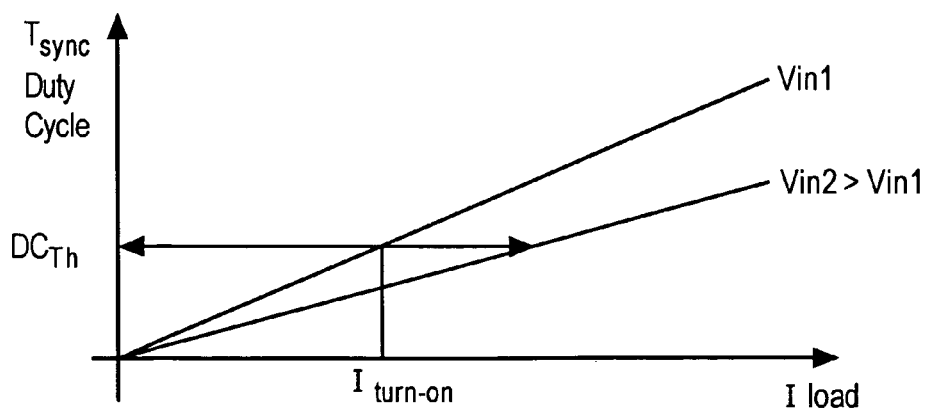
FIG. 4 is a diagram showing a duty cycle of a synchronous switch as a function of a load current.

The diagram in FIG. 4 shows the $T_{sync}$ duty cycle as a function of ILoad for two different values of Vin. If a certain value $DC_{Th}$ of the $T_{sync}$ duty cycle is chosen as the threshold corresponding to some desired load current $I_{turn-on}$ for input voltage Vin=Vin1, then the load current corresponding to this threshold would be much higher if the input voltage were in fact Vin2>Vin1. This dependence can be eliminated by scaling the duty cycle calculation by the value Vin.

The $T_{sync}$ duty cycle may be determined as an average value of a signal controlling the synchronous switch M2 or equivalently the DC component of its spectrum. Referring back to FIG. 1, an averaging circuit 20 is connected to the gate of the synchronous switch M2 to determine the average value of the digital signal controlling the synchronous switch M2. For example, the averaging circuit 20 may perform low-pass filtering of the digital signal that controls the synchronous switch M2. This digital signal may be produced by the buffer 18 as a pulse signal, the amplitude of which varies from 0V in an off state to a level proportional to the input voltage Vin in an on state. In this case, the scaling for the value Vin is accomplished automatically. The averaging circuit 20 produces a signal proportional to a value of the load current ILoad.

Figure 5:
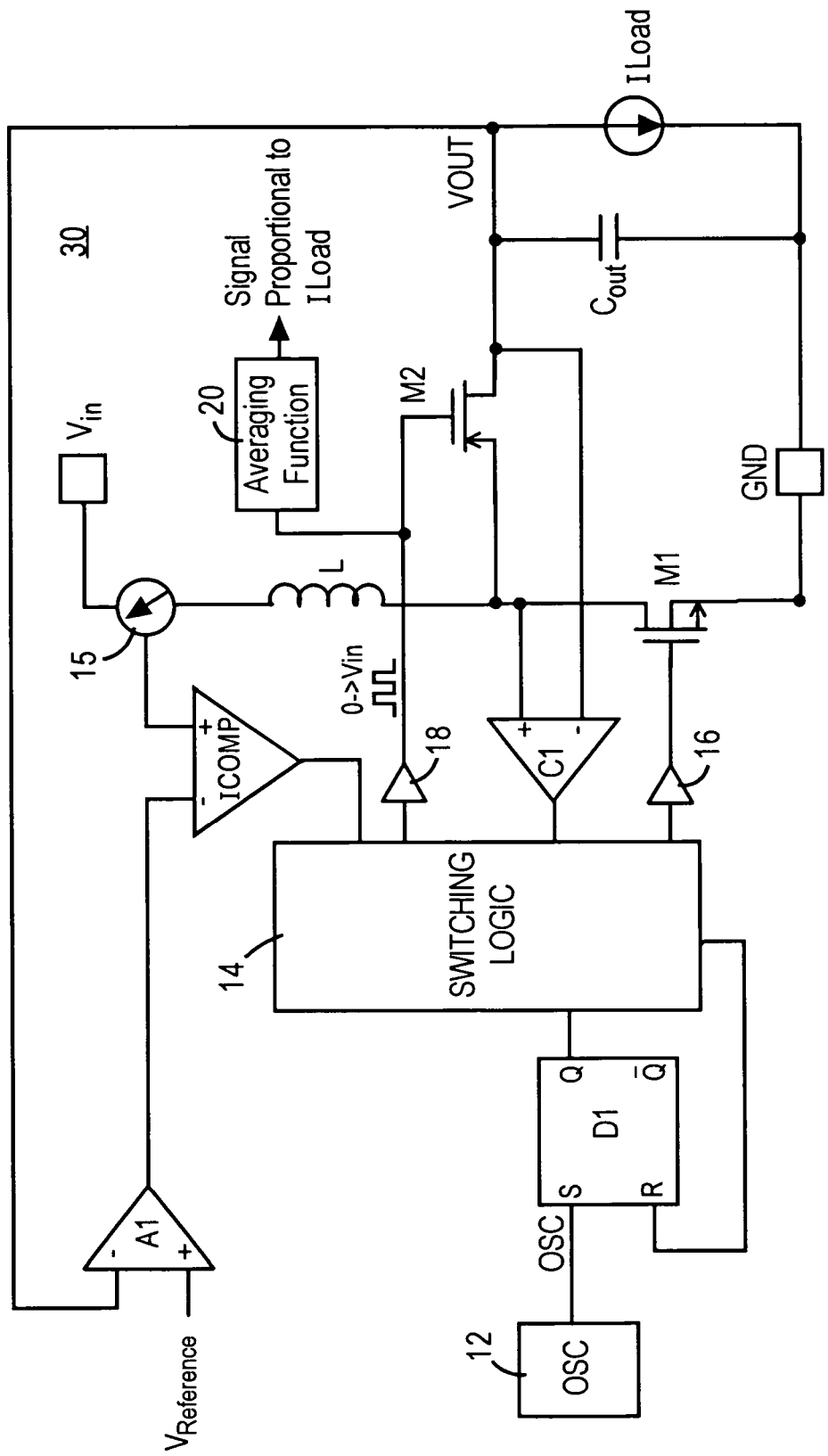
FIG. 5 is a diagram showing a synchronous step-up switching regulator in accordance with a present disclosure.

FIG. 5 shows another embodiment of the present disclosure, in which the load current ILoad is determined in a synchronous step-up switching regulator 30 having a main switch M1 and a synchronous switch M2. For example, the main switch M1 may be an N-type MOSFET, whereas the synchronous switch M2 may be a P-type MOSFET. Similarly to the arrangement shown in FIG. 1, the switching regulator 30 comprises an output capacitor Cout connected between the output terminal Vout and a ground terminal. An inductor L is connected between electrodes of the switches M1 and M2 and the input terminal Vin.

Also similarly to FIG. 1, the arrangement in FIG. 5 contains the pulse oscillator 12 that generates pulses to set the latch D1, and the switching logic 14 controlled by the output Q of the latch D, and by the outputs of the current comparator ICOMP and the reverse current comparator C1. The current comparator ICOMP is connected to a current-to-voltage converter 15 and the output of the error amplifier A1 provided for comparing the output voltage Vout with a reference voltage Vreference. The buffers 16 and 18 are provided at the outputs of the switching logic 14 for driving gates of the switches M1 and M2, respectively.

The averaging circuit 20 is connected to the gate of the synchronous switch M2 to determine the average value of the digital signal controlling the synchronous switch M2. For example, the averaging circuit 20 may perform low-pass filtering of this digital signal, which may be produced by the buffer 18 as a pulse signal, the amplitude of which varies from 0V in an off state to a level proportional to the input voltage Vin in an on state. A signal proportional to a value of the load current ILoad is produced at the output of the averaging circuit 20.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A switching regulator circuit operable in a pulse skipping mode of operation, comprising:
    a first switch and a second switch, and
    a circuit for determining the load current based on a ratio of time when the second switch is on in the pulse skipping mode to an average period of a switching cycle in the pulse skipping mode.

2. The circuit of claim 1, further comprising an output capacitive element, and an inductance element coupled to the output capacitive element.

3. The circuit of claim 2, wherein the first switch is controllable to apply an input voltage to the inductive element to produce current for charging the output capacitive element, and the second switch is controllable to supply the produced current to the output capacitive element when the first switch is turned off.

4. The circuit of claim 1, wherein the load current determining circuit is responsive to a signal proportional to the input voltage.

5. The circuit of claim 1, wherein the load current determining circuit is responsive to a switch control signal for controlling the second switch.

6. The circuit of claim 5, wherein the load current determining circuit is configured to determine an average value of the switch control signal.

7. The circuit of claim 5, wherein the load current determining circuit comprises a low-pass filter for filtering the switch control signal.

8. The circuit of claim 1, wherein the first switch is turned on when the second switch is turned off, if the load current exceeds a predetermined value.

9. The circuit of claim 8, wherein the first switch is prevented from turning on when the second switch is turned off, if the load current does not exceed the predetermined value.

10. The circuit of claim 1, wherein the first switch comprises a P-type field-effect transistor and the second switch comprises an N-type field-effect transistor.

11. The circuit of claim 1, wherein the first switch comprises an N-type field-effect transistor and the second switch comprises a P-type field-effect transistor.

12. A method of determining a load current supplied by a switching regulator circuit operable in a pulse skipping mode, and having a first switch controllable to apply an input voltage for charging an output capacitive element, and a second switch configured to turn on when the first switch is turned off;
    the method comprising steps of:
    measuring a duty cycle of the second switch in the pulse skipping mode, and determining the load current therefrom.

13. The method of claim 12, wherein the first switch is turned on when the second switch is turned off, if the load current exceeds a predetermined value.

14. The method of claim 13, wherein the first switch is prevented from turning on when the second switch is turned off, if the load current does not exceed the predetermined value.

15. The method of claim 13, wherein the load current measuring step includes determining an average value of a signal proportional to the input voltage.

16. The method of claim 13, wherein the load current measuring step includes determining an average value of a signal for controlling the second switch.

17. Apparatus for determining a load current supplied by a switching regulator circuit operable in a pulse skipping mode, and having alternately switchable a P-type field-effect element and an N-type field-effect element, the apparatus comprising a circuit for measuring a duty cycle of the N-type field effect element in the pulse skipping mode.

18. Apparatus for determining a load current supplied by a switching regulator circuit operable in a pulse skipping mode, and having alternately switchable an N-type field-effect element and a P-type field-effect element, the apparatus comprising a circuit for measuring a duty cycle of the P-type field effect element in the pulse skipping mode.

* * * * *